3,267,257
AIRCRAFT BOMBSIGHTS
Geoffrey Arthur Shippey, Zurich, Switzerland, and Gordon Leslie Harper, Edinburgh, Scotland; said Shippey assignor to Ferranti Limited, Lancashire, England, a company of Great Britain and Northern Ireland
Filed March 13, 1962, Ser. No. 179,323
Claims priority, application Great Britain, Mar. 15, 1961, 9,571/61
5 Claims. (Cl. 235—61.5)

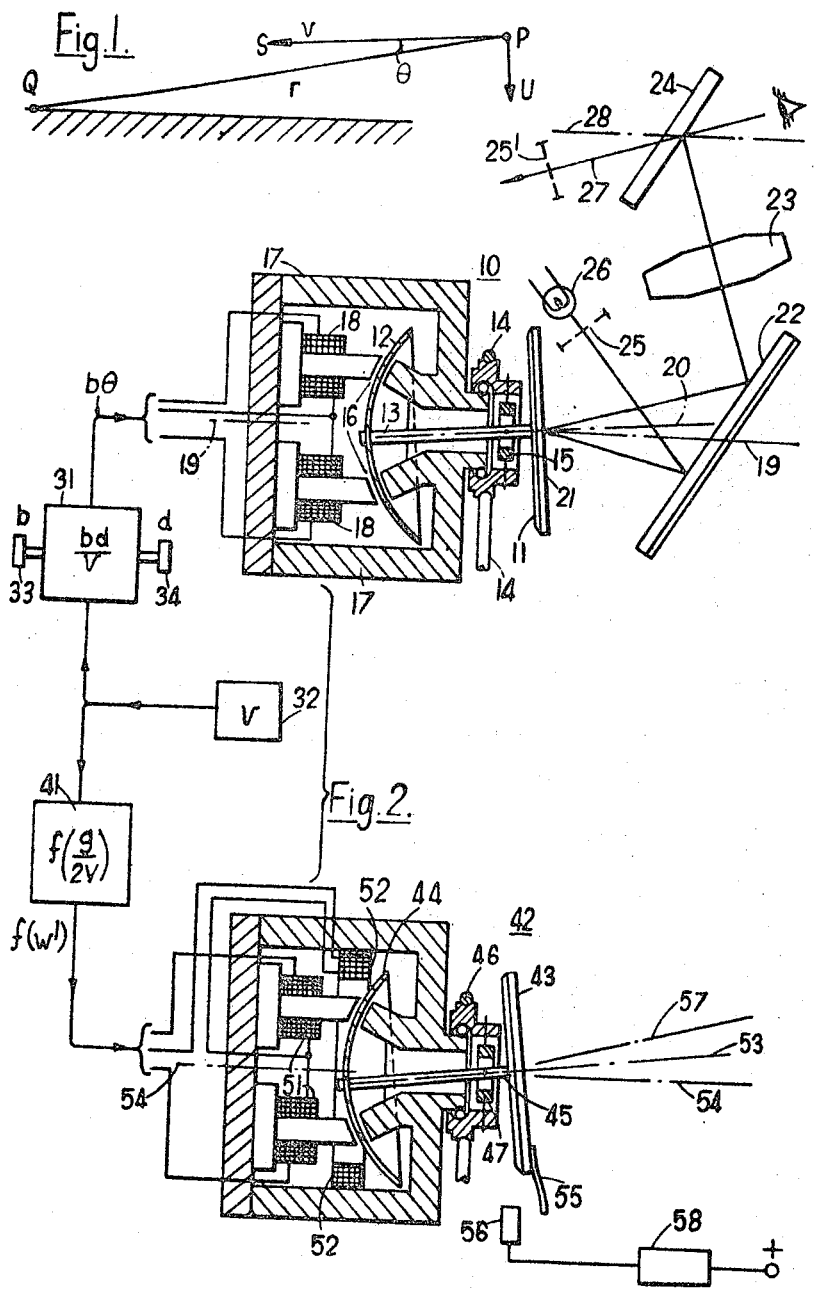

This invention relates to aircraft bombsights.

An object of the invention is to provide such a bombsight which is sufficiently simple in use to be suitable for unaided operation by the pilot.

A further object is to provide such a bombsight which allows the manner of attack—such as the height of attack or duration of bomb flight—to be to some extent selectable.

In accordance with the present invention, an aircraft bombsight includes a sighting head for viewing the target against an aiming mark at an angle of sight line depressed from the flight line, measuring apparatus for continuously deriving a smoothed measured quantity which is dependent on a characteristic of the aircraft's motion in the pitch plane whilst the aircraft is following a course such that said aiming mark is maintained in alignment with the target, computing apparatus for continuously deriving a computed quantity dependent on the critical value of said characteristic which corresponds to the correct instant for releasing the bomb so as to hit the target, and release apparatus to supply a bomb release signal when the measured quantity so corresponds to the computed quantity that in operation the bomb is released at said correct instant.

In the accompanying drawings,

FIGURE 1 is a geometrical diagram to explain the principle of operation of the invention, and FIGURE 2 is a diagram, partly schematic and partly in block form, of one embodiment of the invention.

The principle of operation of the invention will first be described with reference to FIG. 1 for the case where the characteristic of the aircraft's motion is the pitch rate of the aircraft. In this diagram P represents an aircraft attacking a target at Q at a range $r$, the pitch plane being that of the paper. If the pilot flies his craft at an airspeed $v$ whilst maintaining his line of sight PQ to the target depressed from the flight line PS at an angle $\theta$, which for the moment will be assumed to be constant, then from elementary geometrical considerations the rate of turn $w$ of the sight line PQ about Q as centre is given by the equation $$w = (v \sin \theta)/r, \ = v\theta/r \qquad (1)$$

where $\theta$ is small.

As $\theta$ is assumed to be constant this rate of turn of the sight line is the same as the pitchrate of the craft.

For a bomb to hit the target after a flight of duration $T$ after being released at particular values $R$ and $V$ of range and airspeed, assuming that the craft is flying approximately level and neglecting air frictional forces acting on the bomb, we have:

$$R \sin \theta = \tfrac{1}{2} g T^2 \qquad (2)$$

and $$T = R/V \qquad (3)$$

Substituting this value of $T$ in Equation 2, and replacing $\sin \theta$ by $\theta$, assuming again a small value for this angle, we get:

$$R\theta = \tfrac{1}{2} g R^2/V^2, \text{ or } \theta = gR/2V^2 \qquad (4)$$

The critical pitch rate $w^1$ is found from Equation 1 to be given by $$w^1 = V\theta R; \text{ hence } \theta = Rw^1/V \qquad (5)$$

Substituting this value of $\theta$ in Equation 4:

$$Rw^1/V = gR/2V^2 \text{ hence } w^1 = g/2V \qquad (6)$$

Thus by flying a course which maintains his line of sight to the target at a fixed angle below the flight line, thereby causing both lines to turn at an accelerated rate, a critical value $w^1$ of the pitch rate, dependent inversely on the airspeed, will eventually be reached such that a bomb released at that instant will hit the target.

A bombsight operating in reliance on these equations, therefore, includes computing apparatus for continuously computing the critical pitch rate $w^1$ in inverse dependence on the airspeed, together with apparatus for continuously measuring the actual pitch rate $w$—this quantity being heavily smoothed to prevent misoperation due to turbulence—and release apparatus arranged to release the bomb when the measured value of the pitch rate reaches the computed critical value.

Though the inclination $\theta$ of the sight line below the flight line has been assumed to be constant—and indeed the quantity $\theta$ is absent from Equation 6—it will be apparent from Equation 5 that for any given value of $w^1$, $\theta$ is in fact dependent on $r$ and $v$. Accordingly the value of $\theta$ should be chosen so as to suit those quantities. For example, if $\theta$ is too large, the critical range R at which the pitch rate has its critical value may be too great for accuracy; and if on the other hand $\theta$ is too small, the range at the moment of release may be too close for the safety of the craft. A value of $\theta$ suitable for realistic values of R should therefore be chosen.

Alternatively, $\theta$ need not be fixed but may for example be made inversely proportional to $v$ by some constant $d$, so that:

$$\theta = d/v \qquad (7)$$

A suitable value for $d$ may then be found from Equation 4:

$\theta$ (at release) $= gR/2V^2$. Substituting $d/V$ for $\theta$ we get:

$$d = \tfrac{1}{2} gR/V, \ = \tfrac{1}{2} gT \text{ (from (3))} \qquad (8)$$

Hence $d$ may be chosen to give a suitable fixed value for the duration T of bomb flight, and the sighting head arranged to be automatically adjusted to maintain $\theta$ inversely dependent on the airspeed and directly dependent, by the control of $d$, on the desired duration of bomb flight.

The above equations assume a shallow angle of dive—from 15° to 35°, say. To make the equations applicable for a further range of dive angles it is advisable to reduce the value of $\theta$ by multiplying it by some constant factor $b$, and the sighting head may be fitted with a further control for this purpose.

A particular form of aircraft bombsight in accordance with one embodiment of the invention will now be described with reference to FIG. 2.

The sighting head includes gyro apparatus 10 similar to that shown in FIG. 2 of British patent specification No. 578,958 (U.S. Patent No. 2,527,245). Briefly, this apparatus includes a gyro rotor comprising the actual weighted gyro wheel 11 and a spherical dome 12 of electrically conductive material such as aluminium secured to a common spindle 13. The rotor is driven by a belt 14 from a motor (not shown) by way of a Hooke's joint 15 (shown in section) which acts also as the suspension for the rotor. The centre of curvature of the dome 12 coincides with the centre of the joint.

The dome passes through airgaps 16 between the pole faces of four independent magnetic systems each of which includes a magnetic circuit 17 energized by a coil 18 individual to it. These four systems are located symmetrically in pairs with respect to what may be termed the datum axis 19 of the instrument, this axis being coincident with the spin axis 20 of the gyro except when the coils are differentially energised as described below. The centre lines of one pair of magnetic circuits and those of the other pair lie respectively in orthogonal planes intersecting in the datum axis. One of these planes, that of the paper in the figure, is the plane of elevation when the aircraft is in level flight. The following description refers only to the two magnetic systems which are centred on this plane, the coils 18 of which will be referred to for convenience as the elevation coils. The other two systems may be energised to introduce an aiming correction for the drift angle of the aircraft, or may be used to assist in caging the gyro as described later, or may not be used at all.

The front face of the gyro wheel 11 has a mirror 21 which forms part of an optical display system—including a fixed mirror 22, a lens 23, and a transmitting reflector 24—which provides for the pilot a head-up display at infinity of an image of a graticule 25 as illuminated by a lamp 26. This image, $25^1$, which constitutes the actual aiming mark of the sighting head, defines the line of sight 27 from the pilot to the target at the angle of depression $b\theta$ from the flight line 28.

The elevation coils 18 are energised from an analogue computing stage 31. Into this is fed a signal proportional to the airspeed $v$ from some source 32. If necessary this input to stage 31 could be set by hand by the pilot in dependence on his reading of his airspeed indicator; preferably, of course, the signal is derived continuously in source 32 by means of some convenient follow-up system. Manual controls 33 and 34 allow the pilot to preset in stage 31 further inputs representing appropriate values of $b$ and $d$, referred to above. Stage 31 operates so as continuously to solve Equation 7 and multiply the derived value of $\theta$ by $b$, so that the elevation coils 18 are energised—conveniently, in push-pull—in dependence on the quantity $b\theta$.

The eddy currents induced by coils 18 in the rotating dome 12 when the gyro is in operation apply constraints to the gyro equivalent to two springs acting in opposite directions in the elevation plane, the respective forces being dependent on the flux strength. The effective magnetic axis of the two magnetic systems, and hence the effective centre of action of the constraint, is movable in the elevation plane in dependence on the relative values of the currents in the two coils and hence in dependence on the signal from stage 31, with the result that the angle of depression of the sight line 27 below the flight line 28 has the value $b\theta$. For shallow angles of dive, of course, $b$ equals unity, the angle of depression being then $\theta$.

Computing apparatus for continuously deriving the computed value of $w^1$—or, more accurately, a quantity which is a mathematical function of $w^1$ to an extent which is indicated later—includes a second analogue computer 41 fed from source 32 by a signal dependent on airspeed and arranged to derive the quantity $f(g/2V)$—that is, a quantity which is a function of the value of $w^1$ derived in Equation 6.

Apparatus for continuously deriving a smoothed measured quantity dependent on the actual value of $w$ includes further gyro apparatus 42 similar to apparatus 10, with a gyro wheel 43 coupled to a spindle 45 and driven by a belt 46 from a motor (not shown) by way of a Hooke's joint suspension 47. The magnetic systems associated with the dome 44 similarly include two which are centered on what is the plane of elevation when the craft is flying level and which are controlled by coils 51, which will be referred to as the elevation coils. Also associated with the dome is a third coil 52 the eddy currents induced by which in dome 44 act symmetrically on the gyro when its spin axis 53 coincides with the datum, or magnetic, axis 54 of the apparatus.

In apparatus 42 the gyro wheel 43 does not carry a mirror but instead is provided with some sort of electrical contact 55, formed by a very light spring, arranged to engage a co-operating fixed contact 56 when the spin axis 53 has been rotated to the critical position, represented by the datum axis 54, from an initial position 57. Contact 55 is earthed in some convenient manner, such as by way of spindle 45 and Hooke's joint 47, and contact 56 is connected to a source of potential by way of apparatus 58 which when energised by the closing of contacts 55 and 56 release the bomb.

Coils 51 are fed in push-pull by the signal from stage 41, with coil 52 in the common lead.

In accordance with the action of an eddy-current controlled gyro of this kind, any change of the pitch angle of the craft is accompanied by a deflection of spin axis 53 of gyro 42 which is proportional to the smoothed rate of change of the pitch angle—conveniently described as the smoothed pitch rate. The signal applied by stage 41 to coils 51 and 52 is such a function of the computed critical pitch rate $w^1$ that the eddy currents set up by the coils in dome 44 bias spin axis 53 from the critical position 54 to the initial position 57 which is such that by the time the actual pitch rate has attained the critical value the spin axis has returned to the critical position 54 at which contacts 55 and 56 close to release the bomb.

In operation, then, when the pilot decides to engage a target he uncages gyro 10, switches on the airspeed signal to computer 31, and adjusts the control knobs 33 and 34 to the appropriate range of dive angles and to the desired duration of bomb flight respectively. He then begins to track the target by so flying the craft that he continuously sees the target aligned with the aiming mark constituted by the image $25^1$ of graticule 25 in the sighting head. He thereby imposes on the pitch angle a downward turn at an accelerated rate. With the target thus engaged he now uncages gyro 42, applies the airspeed signal to computer 41, and removes the safety catch from the bomb release gear.

Thereafter the pilot need take no further action as regards the bomb release except to maintain engagement of the target as above described. Any change in the airspeed is taken care of by stage 31, which ensures that at any given moment the sight line 27 is depressed at that value of the angle $\theta$ below the flight line as is appropriate to the airspeed at that moment. In the meantime gyro 42 is following the accelerating pitch rate from the bias position, as determined by the computed function of the critical pitch rate $w^1$ derived by stage 41, until the critical position 54 of its spin axis is reached and the bomb becomes automatically released.

With coils 51 and 52 energised as described, coil 52 carries a constant current and so applies to the dome a steady polarising flux which increases the effective action of the push-pull energised elevation coils 51.

The actual caging of the gyros, when a target is not being engaged, is effected by energising appropriate ones of the coils 18, 51, or 52, or other coils similarly acting on the domes, so as to define each magnetic centre sufficiently strongly to prevent movement of the corresponding gyro axis under inertial forces, whilst allowing each computer to maintain the gyro axis in the bias position appropriate to the value of the airspeed. As soon as each gyro is uncaged, therefore, its axis is in the appropriate position for the start of the run up.

Owing to the fact that, as explained above, gyro 10 also responds to the change of pitch, the relative sensitivities of the two gyro systems is of importance. By the "sensitivity" of such an eddy current controlled kind of gyro is meant the ratio of the deflection of its spin axis to a steady pitch rate which produces it, this sensitivity being inversely dependent on the strength of the flux which sets up the eddy currents. Gyro 42 must be sensitive enough to carry out its smoothing function. The requirements for the sensitivity gyro 10 are somewhat conflicting. Experiments have shown that errors in the time of bomb release caused by variation in the duration of the tracking run are much reduced if the sensitivity of this gyro is made equal, or nearly equal, to that of gyro 42. On the other hand such relative sensitivities increase the errors in the time of release caused by movement of the craft in turbulent air and render tracking difficult. An effective compromise is to arrange for the sighting-head gyro 10 to be somewhat less sensitive than the measuring gyro 42.

In an alternative arrangement, the signal from stage 41 is applied so as to control the extent of separation of contacts 55 and 56, rather than the bias of the spin axis.

Computer stages 31 and 41 may include simple analogue assemblies of interconnected potentiometers and rheostats on the moving contacts of which the various input quantities are set up.

Where the characteristic of the aircraft's motion is the craft's acceleration in a direction normal to the wings, the principle of operation of the bombsight is as follows:

From FIG. 1 it will be seen that where $a$ is the acceleration in the direction normal to the wings—that is, in the direction PU normal to the flight direction PS—we have from elementary considerations $$a = vw \qquad (9)$$

Substituting $a/w$ for $v$ in the generalised form of Equation 6, namely, $w = g/2v$, we get:

$$a = g/2 \qquad (10)$$

Hence in this form of bombsight the quantity measured and smoothed is one dependent on the quantity $a$; with this is compared a quantity representing the critical value $g/2$ and the bomb release signal is derived when the two quantities appropriately correspond.

To simplify the description of the disclosed embodiment of the invention, only the simplest forms of the basic equations have been used. For more accurate working some of the assumptions made above are no longer valid and various loss factors and other sources of error have to be considered. All such matters may be taken into account by suitably designing the computing stages and by adjusting where necessary the relative sensitivities of the two gyros.

What we claim is:

1. An aircraft bombsight for use in an aircraft having a known airspeed and for providing a desired duration of bomb flight including
   (a) a sighting head for viewing the target against an aiming mark at an angle of sight line depressed from the flight line of the aircraft,
   (b) pitch-rate measuring apparatus for continuously generating a smoothed measured quantity which is proportional to the pitch rate of the aircraft,
   (c) computing apparatus for continuously generating a computed quantity proportional to the critical value of the pitch rate which, whilst the aircraft is following a curved diving course in the pitch plane such that said aiming mark is maintained in alignment with the target, corresponds to the correct instant for releasing the bomb so as to hit the target, and
   (d) release apparatus connected to the measuring apparatus and the computing apparatus and arranged to supply a bomb release signal when the measured quantity so corresponds to the computed quantity whilst the aircraft is following said curved diving course that in operation the bomb is released at the correct instant.

2. Apparatus as claimed in claim 1 wherein the computing apparatus is arranged to generate the computed quantity in inverse proportion to the airspeed, and the measuring apparatus includes
   (b)(1) a gyro having a rotor and a conductive member rotatable with said rotor, and
   (b)(2) electromagnetic means connected to the computing apparatus and arranged to precess the gyro by eddy current drag applied to said conductive member under the control of the computing apparatus so as to bias the inclination of the spin axis of the gyro to an initial position displaced from a critical position of said axis, in proportion to said computed quantity, said critical position corresponding to said critical value of the pitch rate, whereby the measured quantity is proportional to the inclination of the spin axis of the gyro with respect to said initial position,
   said release apparatus including
   (d)(1) a switch device operable by the gyro to release the bomb when the spin axis of the gyro reaches said critical position.

3. Apparatus as claimed in claim 1 including
   (e) means for automatically adjusting the sighting head to maintain the depressed inclination of the sight line from the flight line inversely proportional to the airspeed of the aircraft and directly proportional to the desired duration of bomb flight.

4. Apparatus as claimed in claim 3 wherein said means for adjusting the sighting head includes
   (e)(1) a gyro having a rotor and a conductive member rotatable with said rotor,
   (e)(2) means for adjusting the inclination of the aiming mark of the sighting head in proportion to the inclination of the spin axis of the gyro with respect to a datum direction, and
   (e)(3) means for precessing the gyro by eddy current drag applied to said conductive member in appropriate proportion to the airspeed and desired duration of bomb flight.

5. Apparatus as claimed in claim 2 including
   (f) means for adjusting the sighting head comprising
   (f)(1) a second gyro having a rotor and a conductive member rotatable with said rotor,
   (f)(2) means for adjusting the inclination of the aiming mark of the sighting head in proportion to the inclination of the spin axis of the second gyro with respect to a datum direction, and
   (f)(3) means for precessing the second gyro by eddy current drag applied to the conductive member thereof in such proportion to the airspeed of the aircraft and the desired duration of bomb flight as to maintain the depressed inclination of the sight line inversely proportional to said airspeed and directly proportional to said duration,
   the second gyro being slightly less sensitive than the first-mentioned gyro.

References Cited by the Examiner

UNITED STATES PATENTS

| | | | |
|---|---|---|---|
| 2,371,606 | 3/1945 | Chafee et al. | 235—61.5 |
| 2,410,468 | 11/1946 | Van Auken et al. | 235—61.5 |
| 3,091,993 | 6/1963 | Brink et al. | 235—61.5 |

FOREIGN PATENTS 804,700  11/1958  Great Britain.

MALCOLM A. MORRISON, *Primary Examiner.*

K. W. DOBYNS, *Assistant Examiner.*